United States Patent [19]

Anglin

[11] 4,139,861
[45] Feb. 13, 1979

[54] SINGLE GUN COLOR PICTURE TUBE BRIGHTENER

[76] Inventor: Russell E. Anglin, 6157 Cottle Rd., San Jose, Calif. 95123

[21] Appl. No.: 758,422

[22] Filed: Jan. 11, 1977

[51] Int. Cl.² .................................................. H04N 9/18
[52] U.S. Cl. ....................................... 358/29; 313/409; 313/441; 315/13 CG; 358/74
[58] Field of Search ................... 358/29, 64, 65, 74; 315/30, 13 CG; 313/409, 441

[56] References Cited

U.S. PATENT DOCUMENTS

| | | | |
|---|---|---|---|
| 3,059,140 | 10/1962 | Heuer | 315/13 CG |
| 3,927,346 | 12/1975 | Spannhake | 358/74 |
| 3,967,314 | 6/1976 | Anglin | 358/29 |

Primary Examiner—Robert L. Richardson

[57] ABSTRACT

A means is disclosed for selectively and collectively increasing the emission of each color cathode of a single gun color picture tube. By placing a variable resistance between each color cathode and the control grid, this provides a source for increasing the voltage between the control grid and the selected color cathode. As the resistance of the control is decreased the emission of that color cathode is increased, thereby making it possible to increase emission on any or all cathodes.

5 Claims, 3 Drawing Figures

SINGLE GUN COLOR PICTURE TUBE BRIGHTENER

GENERAL STATEMENT OF INVENTION

In a single gun color picture tube the luminosity signal or more commonly called the Y signal is combined with the three color signals at the color amplifiers. From here the Y signal and the color difference signals, B-Y, R-Y, and G-Y are used to modulate the three color cathodes of the picture tube. The amount of brightness is fixed by the amount of drive in the video circuits and the maximum voltages available on the picture tube elements. These levels are fixed and proper for the tube at time of manufacture. As the picture tube ages and the emission on any one or all of the cathodes drop below normal viewing level these levels can be increased and controlled by inserting a variable resistance as outlined in the invention herewith.

In its basic concept, the invention disclosed herein, restores the brightness to a single gun color picture tube in such a manner that any or all color cathodes that are weak or low on emission can be affected seperately or collectively and the cathode emission can be controlled likewise.

The control according to the present invention will boost the output or emission in a single gun color picture tube by decreasing the resistance between the control grid and the selected cathode. This type of emission control is known as grid-bias variation and effects the cathode circuit in which the resistance is altered.

The unit disclosed herein is constructed of four slide resistance controls and a fixed resistor. The three controls connected to the three cathodes are 750,000 ohms each, connected in series with these three controls is a 75,000 ohm master control and connected thereto is a 10,000 ohm fixed resistor. The emission can be increased on each color cathode seperately by lowering the resistance in that control, if more emission is needed the master control is lowered in resistance, or should all cathode emissions need to be increased the three cathode controls are moved to a point where the three colors are properly blended then the master control is advanced to increase tube brightness. The fixed resistor is to prevent complete shorting of the elements.

Although the invention is in no way limited to particular values, very satisfactory results were obtained with potentiometers of above mentioned values. With this particular network, it is assumed that the amounts of drive fall within the adjustment range of the potentiometers. This invention in no way is limited to the design as shown, which uses a network of four potentiometers adaptable to a single gun color picture tube, this same arrangement could also be used and incorporated in the set design, the invention is intended to cover any such application.

REFERENCE TO PRIOR ART

The circuit disclosed herein shows an improvement over the circuits disclosed in U.S. Pat. Nos. 2,742,522; 2,757,316; 2,839,600; 2,923,727; 3,790,840; 3,967,314.

Restoration of emission of cathode ray tubes, heretofore, has involved the application of increased heater voltage by means of an AC transformer. With the advent of solid state circuitry stepped up voltage is not as practical, this is due to a heater transformer within the set that is limited in the amount of power it will deliver, also steppedup AC voltage can be damageing to the picture tube.

Applicant has developed a different type of picture tube brightener, using an entirely different principle, whereby the emission can be controlled on any and all color cathodes of a single gun color picture tube.

The control according to the present invention will boost the emission on a single gun color tube by, grid bias variation. This is accomplished by a variable resistance or potentiometer connected between the control grid and each color cathode, as the control resistance is lowered, emission is increased on that cathode.

OBJECTS OF THE INVENTION

It is an object of the invention to provide an improved circuit for increasing and controling the emission of a single gun color picture tube.

Another object of the invention is to provide controls that are adaptable to the wiring of a single gun color picture tube for the purpose of increasing emission and therefore increasing tube brightness; a unit that is simple to construct, economical to manufacture, and simple and efficient to use.

With the above and other objects in view, the present invention consist of the combination and arrangement of parts, hereinafter, more fully described, illustrated in the accompanying drawings and more particularly pointed out in the appended claims; it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
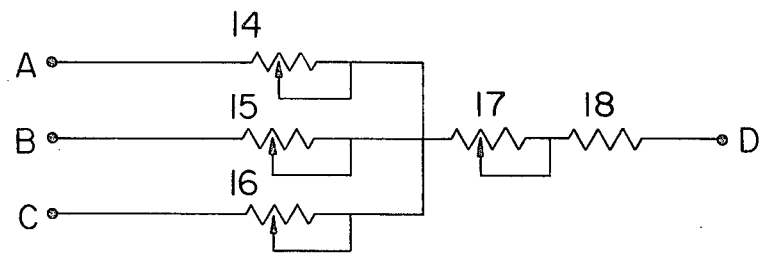
FIG. 1 Is a schematic diagram showing how the unit components are connected.
Figure 2:
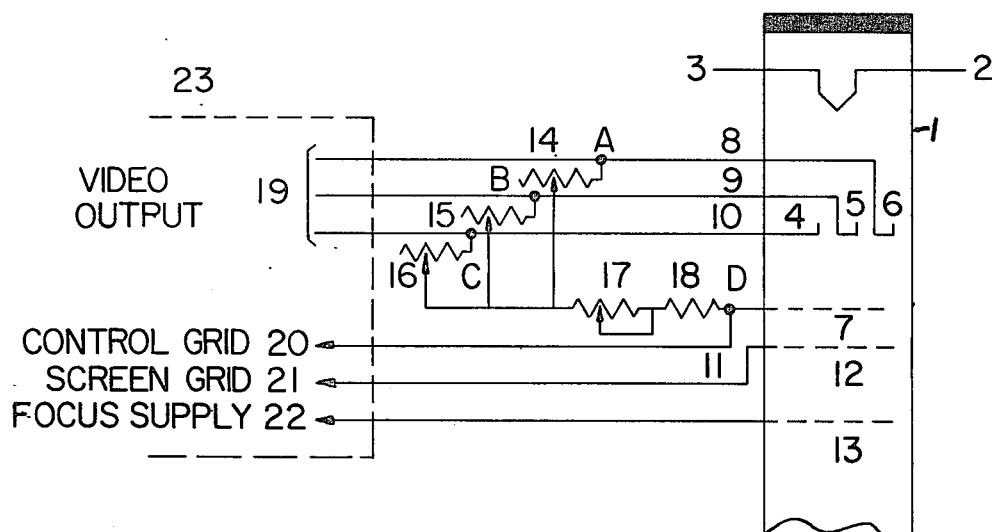
FIG. 2 Is a view of a single gun color picture tube, showing the tube elements and connections according to the invention.
Figure 3:
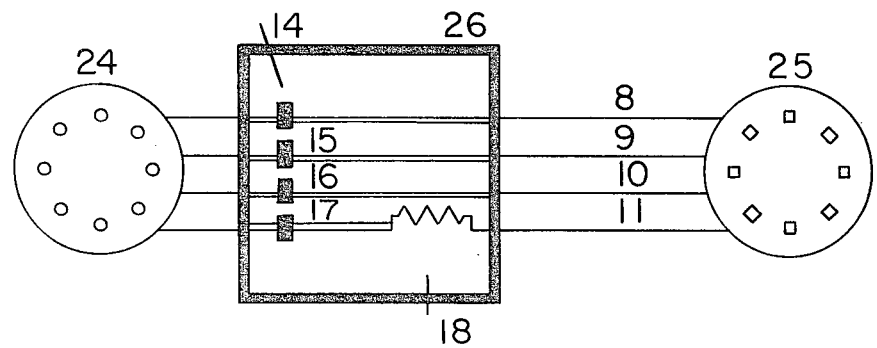
FIG. 3 Is a view of the constructed unit, shown, interposed on the picture tube wiring.

Now with more particular reference to the drawings, a single gun color brightness control is shown made up of potentiometers 14, 15, 16 and 17 and fixed resistor 18, contained in a single unit 26, interposed on wires 8, 9, 10 and 11 connecting to socket 24 and plug 25.

The socket 24 is adapted to be plugged into the picture tube 1, and plug 25 connected to the wired picture tube socket coming from the circuit 23. Video output circuits 19 are connected to cathodes 4, 5, and 6 by suitable wires 8, 9, and 10. One side of potentiometer 14 connecting to wire 8 and cathode 6, one side of potentiometer 15 connecting to wire 9 and cathode 5, one side of potentiometer 16 connecting to wire 10 and cathode 4. Connected in series with the moveable arms of potentiometers 14, 15, and 16 is potentiometer 17 and fixed resistor 18, which connects to wire 11 and control grid 7; wire 11 connects to suitable wire 20 in the TV circuit, connection 21 contains suitable wireing for the screen grid 12, and connection 22 is a suitable supply source for focus anode 13, heater wires 2 and 3 are connected to a suitable supply source.

The unit disclosed herein may be installed when the red, blue or green color levels drop below normal viewing levels and can not be advanced any farther with the set controls. The socket is removed from picture tube 1, and a suitable wireing harness containing brightness control unit 26 is connected between set socket and picture tube.

An alternate method of connecting the brightness control unit 26 to the picture tube wireing, would be to use suitable wire connectors, connecting 14 to wire 8 at point A, connecting potentiometer 15 to wire 9 at point B, connecting potentiometer 16 to wire 10 at point C, and connecting fixed resistor 18 to wire 11 at point D.

The unit disclosed herein contains potentiometers 14, 15 and 16 with resistance values of 750,000 ohms each and potentiometer 17 having a resistance of 75,000 ohms, fixed resistor 18 is 10,000 ohms. Satisfactory results were obtained with the above values. Although the invention is in no way limited to particular values.

The foregoing specification sets forth the invention in its preferred practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. A single gun color picture tube brightener for use with a C.R.T. having a control grid, a first color cathode to which a first color difference signal is applied, a second color cathode to which a second color difference signal is applied and a third color cathode to which a third color difference signal is applied, the brightener comprising
   first potentiometer means coupling said first color cathode to said control grid,
   second potentiometer means coupling said second color cathode to said control grid, and
   third potentiometer means coupling said third color cathode to said control grid,
   whereby said first potentiometer means, said second potentiometer means and said third potentiometer means are operative to vary the respective electron emissions of said first color cathode, said second color cathode and said third color cathode.

2. A single gun color picture tube brightener as recited in claim 1 wherein
   said first potentiometer means includes the series connection of a first color cathode emission adjustment potentiometer, a master brightness control potentiometer and a fixed resistor,
   said second potentiometer means including the series connection of a second color cathode emission adjustment potentiometer, said master brightness control potentiometer and said fixed resistor, and
   said third potentiometer means includes the series connection of a third color cathode emission adjustment potentiometer, said master brightness control potentiometer and said fixed resistor.

3. A single gun color picture tube brightener as recited in claim 2 wherein
   said first color cathode emission adjustment potentiometer, said second color cathode emission adjustment potentiometer, and said third color cathode emission adjustment potentiometer have a maximum resistance value of approximately 750,000 ohms,
   said master brightness control has a maximum resistance value of approximately 75,000 ohms, and
   said fixed resistor is approximately 10,000 ohms.

4. A single gun color picture tube brightener for use with a C.R.T. having a control grid and three color cathodes to which three separate color difference signals are applied, the brightener comprising
   the series connection of a potentiometer and a fixed resistor coupling said control grid to one of said color cathodes.

5. A single gun color picture tube brightener as recited in claim 4 wherein
   said potentiometer has a maximum resistance of approximately 750,000 ohms, and
   said fixed resistor is approximately 10,000 ohms.

* * * * *